(12) United States Patent
Johannessen

(10) Patent No.: US 12,255,756 B2
(45) Date of Patent: Mar. 18, 2025

(54) LINE REPLACEABLE UNIT IDENTIFICATION SYSTEMS AND METHODS

(71) Applicant: B/E AEROSPACE, INC., Winston Salem, NC (US)

(72) Inventor: Eric Johannessen, Holbrook, NY (US)

(73) Assignee: B/E AEROSPACE, INC., Winston Salem, NC (US)

( * ) Notice: Subject to any disclaimer, the term of this patent is extended or adjusted under 35 U.S.C. 154(b) by 422 days.

(21) Appl. No.: 17/581,259

(22) Filed: Jan. 21, 2022

(65) Prior Publication Data

US 2023/0246875 A1    Aug. 3, 2023

(51) Int. Cl.
*H04L 12/417* (2006.01)
*H04L 7/00* (2006.01)
*H04L 12/40* (2006.01)

(52) U.S. Cl.
CPC .......... *H04L 12/417* (2013.01); *H04L 7/0008* (2013.01); *H04L 12/40039* (2013.01)

(58) Field of Classification Search
CPC ............ B64D 2011/0038; H05B 47/18; H04L 12/417
See application file for complete search history.

(56) References Cited

U.S. PATENT DOCUMENTS

| | | |
|---|---|---|
| 5,784,648 A | 7/1998 | Duckwall |
| 6,225,565 B1 | 5/2001 | Prysner |
| 6,573,753 B1 * | 6/2003 | Snyder ........... H03K 19/018585 326/85 |
| 8,378,595 B2 | 2/2013 | Eckel et al. |
| 8,446,173 B1 * | 5/2013 | Faucher ......... H03K 19/017509 326/86 |

(Continued)

FOREIGN PATENT DOCUMENTS

| | | |
|---|---|---|
| JP | 2008112628 | 5/2008 |
| WO | 2011067177 | 6/2011 |
| WO | 2011106661 | 9/2011 |

OTHER PUBLICATIONS

European Patent Office, European Search Report dated Sep. 29, 2023 in Application No. 23150211.3.

(Continued)

*Primary Examiner* — Yee F Lam
(74) *Attorney, Agent, or Firm* — SNELL & WILMER L.L.P.

(57) ABSTRACT

An electronic device may comprise: a token input circuit comprising a token input electrical line, a pull up resistor, and a power source; a token output circuit comprising a token output electrical line and an electrical switch; a communication input electrical line; a communication output electrical line; a processor in electrical communication with the token input electrical line, the token output electrical line, the communication input electrical line, and the communication output electrical line; and a tangible, non-transitory computer-readable storage medium having instructions stored thereon that, in response to execution by the processor, cause the processor to perform operations comprising: receive, via the processor, a token from an adjacent electronic device via the token input electrical line, and determine, based on the token, a location of the electronic device in a string of electronic devices.

17 Claims, 6 Drawing Sheets

(56) References Cited

U.S. PATENT DOCUMENTS

| | | | |
|---|---|---|---|
| 9,192,008 B2 | 11/2015 | Eckel et al. | |
| 9,552,315 B2 | 1/2017 | Monreal | |
| 10,447,493 B2 | 10/2019 | Kinage et al. | |
| 10,715,911 B2 | 7/2020 | Dunn et al. | |
| 11,181,680 B1* | 11/2021 | Sorensen | G02B 6/0036 |
| 2010/0072904 A1* | 3/2010 | Eckel | H05B 47/18 |
| | | | 315/294 |
| 2012/0013252 A1* | 1/2012 | Eckel | H05B 47/18 |
| | | | 315/210 |
| 2012/0019164 A1* | 1/2012 | Gambeski | H05B 45/22 |
| | | | 315/294 |
| 2013/0249404 A1* | 9/2013 | Eckel | H05B 47/18 |
| | | | 315/113 |
| 2014/0089686 A1* | 3/2014 | Lotzenburger | G06F 1/266 |
| | | | 713/300 |
| 2014/0117598 A1* | 5/2014 | May | B60G 17/019 |
| | | | 267/64.27 |
| 2014/0333207 A1* | 11/2014 | Saes | H05B 47/22 |
| | | | 315/132 |
| 2014/0368113 A1* | 12/2014 | Eckel | B60Q 3/80 |
| | | | 315/77 |
| 2020/0145253 A1 | 5/2020 | Hentz et al. | |

OTHER PUBLICATIONS

European Patent Office, European Partial Search Report dated Jun. 15, 2023 in Application No. 23150211.3.

* cited by examiner

LINE REPLACEABLE UNIT IDENTIFICATION SYSTEMS AND METHODS

FIELD

The present disclosure relates generally to lighting systems and methods and, more particularly, to tokening line replaceable units ("LRUs") via a communications shield.

BACKGROUND

Wash lights are used to provide lighting accents generally via indirect lighting (i.e., an area is illuminated primarily by light from the illumination source that is reflected off of another surface). For vehicles in general, and specifically here for aircraft, wash lights can be used to create various moods, particularly when colored lighting is used.

Advances in light emitting diode ("LED") technology has made LEDs an ideal source of light where low-powered lighting solutions are desirable, such as in an aircraft, where power availability is limited. Recently, new technologies have become available that have the potential to enhance the usefulness of LEDs generally, but which have not been fully realized in the context of aircraft lighting.

When utilizing multidrop communications methods/protocols in multi LRU systems there is a need to address units (identify). Currently addressing of LRUs is done either by a dip switch, a RF/EM/magnetic wand, preselected in software or via a separate token line. These token lines are separate discrete I/O that adds cost, weight and thickness to harnesses.

SUMMARY

An electronic device is disclosed herein. In various embodiments, the electronic device comprises: a token input circuit comprising a token input electrical line, a pull up resistor, and a power source; a token output circuit comprising a token output electrical line and an electrical switch; a communication input electrical line; a communication output electrical line; a processor in electrical communication with the token input electrical line, the token output electrical line, the communication input electrical line, and the communication output electrical line; and a tangible, non-transitory computer-readable storage medium having instructions stored thereon that, in response to execution by the processor, cause the processor to perform operations comprising: receive, via the processor, a token from an adjacent electronic device via the token input electrical line, and determine, based on the token, a location of the electronic device in a string of electronic devices.

In various embodiments, the operations further comprise command the electrical switch to transition from an "ON" state to an "OFF" state in response to determining the location of the electronic device. The operations may further comprise releasing the token in response to transitioning the electrical switch from the "ON" state to the "OFF" state.

In various embodiments, the operations further comprise determining the electronic device is a first electronic device in the string of electronic devices based on a forward shield of the electronic device being pulled down from a first voltage to approximately 0 volts from the pull up resistor.

In various embodiments, the token input circuit further comprises a first voltage divider, and wherein the token output circuit further comprises a second voltage divider.

In various embodiments, the token input electrical line is configured to be coupled to a first shield configured to surround a communication wire configured to couple to the communication input electrical line. The token output electrical line may be configured to be coupled to a second shield configured to surround a second communication wire configured to couple to the communication output electrical line.

An electrical system is disclosed herein. The electrical system may comprise: a control system comprising a controller; and a string of electronic devices connected in series, each electronic device electrically coupled to an adjacent electronic device by a communication line segments, each communication line segment enclosed by a shield; each electronic device in the string of electronic devices comprising a local controller in electrical communication with a forward communication line segment and a forward shield, the forward shield surrounding the forward communication line segment.

In various embodiments, the forward shield is configured to reduce electromagnetic interference ("EMI").

In various embodiments, the controller is configured to: release a token to determine a location of each electronic device in the string of electronic devices; and receive, from the local controller of each electronic device, the location of the electronic device in the string of electronic devices.

In various embodiments, the electrical system is an aircraft lighting system. Each electronic device may be a line replaceable unit (LRU) having a plurality of light emitting diodes (LEDs).

In various embodiments, the electrical system is configured to determine a location of each electronic device in the string of electronic devices by creating a circuit between adjacent electronic devices through the forward shield.

An electrical system is disclosed herein. The electrical system may comprise: a control system including a controller; a first electronic device in a string of electronic devices, the first electronic device comprising a local controller electrically coupled to the controller, a token input line in electrical communication with the local controller, a pull up resistor, and a power source; a communication line segment extending from the control system to the first electronic device, the communication line segment in electrical communication with the controller and the local controller; and a shield surrounding the communication line segment, the shield configured to reduce electromagnetic interference ("EMI"), the shield in electrical communication with the token input line, the pull up resistor, and the power source.

In various embodiments, the electrical system comprises the string of electronic devices, each electronic device in the string of electronic devices in accordance with the first electronic device.

In various embodiments, the first electronic device further comprises an electrical switch in electrical communication with a token output line. The local controller may be configured to: receive a token from the controller; and determine, based on the token, that the first electronic device is in a first location in the string of electronic devices. The first location may be determined based on the shield pulling down from a first voltage to approximately 0 volts due to the pull up resistor. The local controller may be further configured to command the electrical switch to transition from an "ON" state to an "OFF" state in response to determining the first electronic device is in the first location in the string of electronic devices. The local controller may be further configured to release the token in response to transitioning the electrical switch from the "ON" state to the "OFF" state.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the following detailed description and claims in connection with the following drawings. While the drawings illustrate various embodiments employing the principles described herein, the drawings do not limit the scope of the claims.

DETAILED DESCRIPTION

Figure 1:
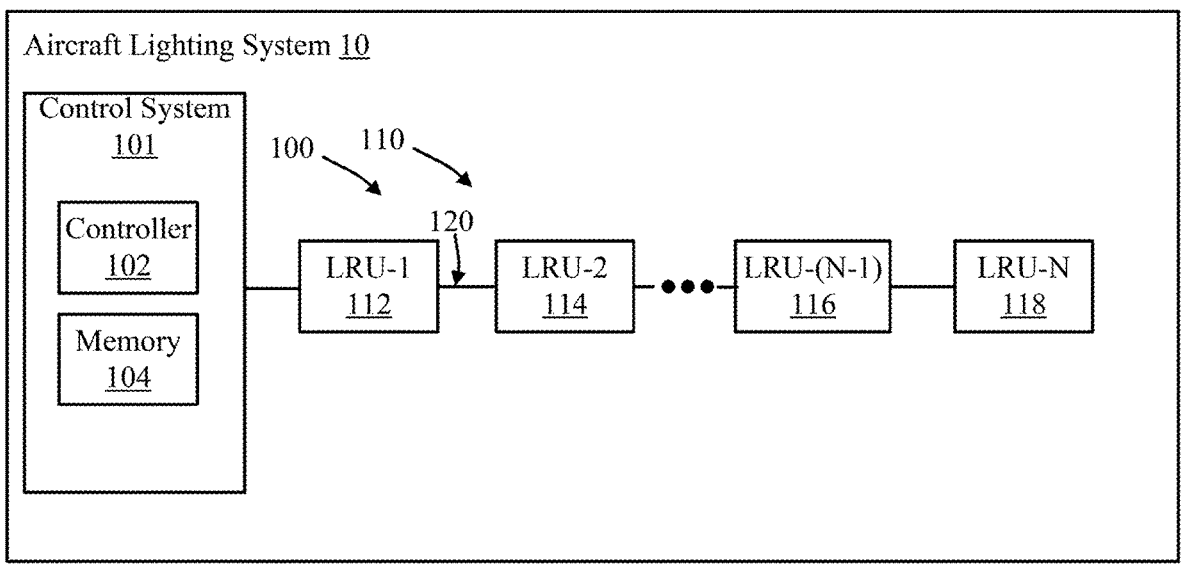
FIG. 1 illustrates a schematic view of an electrical system, in accordance with various embodiments.

The following detailed description of various embodiments herein refers to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

"Electrical line" as referred to herein is a conductive wire, or conductive element on an electronic device, such as one in a printed circuit board or the like and configured to transfer current from one electronic device to another electronic device.

Disclosed herein is an electrical system configured, in various embodiments, with a daisy chain communication system and configured for identification of each LRU in a string of LRUs. In various embodiments, the electrical system comprises a plurality of shields, each shield disposed between adjacent LRUs in the plurality of LRUs and/or between an LRU and a control system. In various embodiments, the shield is configured to surround a wire (e.g., an RS-485 wire) and provide electromagnetic interference ("EMI") reduction. Stated another way, the shield may comprise an EMI shield. In various embodiments the shield that connects from LRU (e.g., light module) to LRU (e.g., adjacent light module) may be utilized as a tokening device. Not only is the shield typically not used other than for shielding purposes, the actually can have voltages on it without affecting its operation. Since all lights need a common ground reference provided by the power/return, the shield can be connected via a resistor to power (e.g., 28 volts, 5 volts, etc.), the LRU (e.g., light module) preceding it would be connected to a ground via a switch (e.g., a relay, transistor, etc.). In various embodiments, the transistor would be on during typical operation which grounds the shield providing the same shielding benefits as normal. During tokening, it would release the resistor and the shield would pull up to the supply voltage.

In various embodiments, the electrical system disclosed herein would, in various embodiments and among other things, reduce weight and cost relative to typical electrical systems with daisy chain communication systems. In particular, a token line (e.g., a wire utilized exclusively for identification of LRUs within the daisy chain), may be eliminated from the typical electrical system. In various embodiments, the electrical system disclosed herein allows the shield (e.g., an EMI shield) to function in a typical manner during normal operation (i.e., outside of a tokening method disclosed herein). In various embodiments, the electrical system disclosed herein facilitates detection of a downstream or upstream LRU for health monitoring (e.g., missing LRU, dead power supply, broken cable, etc.). In various embodiments, the electrical system disclosed herein may provide a communication backup for simple discrete system. In various embodiments, the electrical system disclosed herein is communication bus agnostic (i.e., compatible with various communication buses/systems). In various embodiments, Referring now to FIG. 2, a schematic view of an aircraft lighting system 10 having an electrical system 100 is illustrated in accordance with various embodiments. In various embodiments, the electrical system 100 comprises a control system 101 and a string of electronic device 110. Although described herein with respect to an aircraft lighting system 10, the present disclosure is not limited int his regard. For example, the electrical system 100 disclosed herein may be utilized for any electrical system 100 that connects a string of electronic devices 110 (e.g., LRUs 112, 114, 116), to a network (e.g., a control system 101) via a communication line 120 (e.g., RS485, CAN bus, ethernet, etc.), where identification of each electronic device within the string of electronic devices 110 in the electrical system 100 is desired.

In various embodiments, the string of electronic devices 110 may comprise any number of LRUs aligned in a string via a communication line 120. The communication line 120 is in electrical communication with the control system 101 and each LRU in the string of electronic devices 110. For example, the communication line 120 extends from the control system 101 to a first LRU 112, from the first LRU 112 to a second LRU, and so on until the communication line terminates after extending from an N-1 LRU 116 to a termination LRU 118 (e.g., an Nth LRU of N LRUs). In this regard, the plurality of electronic devices 110 are electrically coupled in series via the communication line 120.

In various embodiments, each LRU in a string of electronic devices 110 for an aircraft lighting system 10 may comprises a plurality of light emitting diodes ("LEDs"). Each LRU may correspond to a different area of an aircraft cabin (e.g., rows 16-25 vs. rows 26-35, a lavatory vs. an aircraft cabin, etc.). The present disclosure is not limited in this regard. It may be desirable to allow control system 101 to command specific LRUs within the string of electronic devices 110 a specific color (e.g., second LRU 114 a different color from first LRU 112), to determine a health status of a specific LRU within the string of electronic devices 110, or the like. In order for the control system 101 to command the correct color to the correct LRU, a location within the chain is determined for each LRU in the plurality of electronic devices 110 as described further herein (e.g., second LRU 114 is determined to be a second electronic device from the control system in the string of electronic devices 110).

In typical electrical systems having a string of electronic devices a distinct electrical line from the communication line is utilized for determining a location of each electronic device in a string of electronic devices, which adds cost, weight, thickness to a harness carrying the electrical lines.

In various embodiments, the control system 101 comprises a controller 102 and a memory 104. In various embodiments each LRU in the string of electronic devices 110 is in electrical communication (e.g., via communication line 120) with the controller 102. In various embodiments, controller 102 may be integrated into computer system of the aircraft. In various embodiments, controller 102 may be configured as a central network element or hub to access various systems and components of the aircraft lighting system 10. Controller 102 may comprise a network, computer-based system, and/or software components configured to provide an access point to various systems and components of the aircraft lighting system 10. In various embodiments, controller 102 may comprise a processor. In various embodiments, controller 102 may be implemented in a single processor. In various embodiments, controller 102 may be implemented as and may include one or more processors and/or one or more tangible, non-transitory memories and be capable of implementing logic (e.g., memory 104). Each processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof. Controller 102 may comprise a processor configured to implement various logical operations in response to execution of instructions, for example, instructions stored on a non-transitory, tangible, computer-readable medium (e.g., memory 104) configured to communicate with controller 102.

System program instructions and/or controller instructions may be loaded onto a non-transitory, tangible computer-readable medium having instructions stored thereon that, in response to execution by a controller, cause the controller to perform various operations. The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" and "non-transitory computer-readable storage medium" should be construed to exclude only those types of transitory computer-readable media which were found in In Re Nuijten to fall outside the scope of patentable subject matter under 35 U.S.C. § 101.

Figure 2:
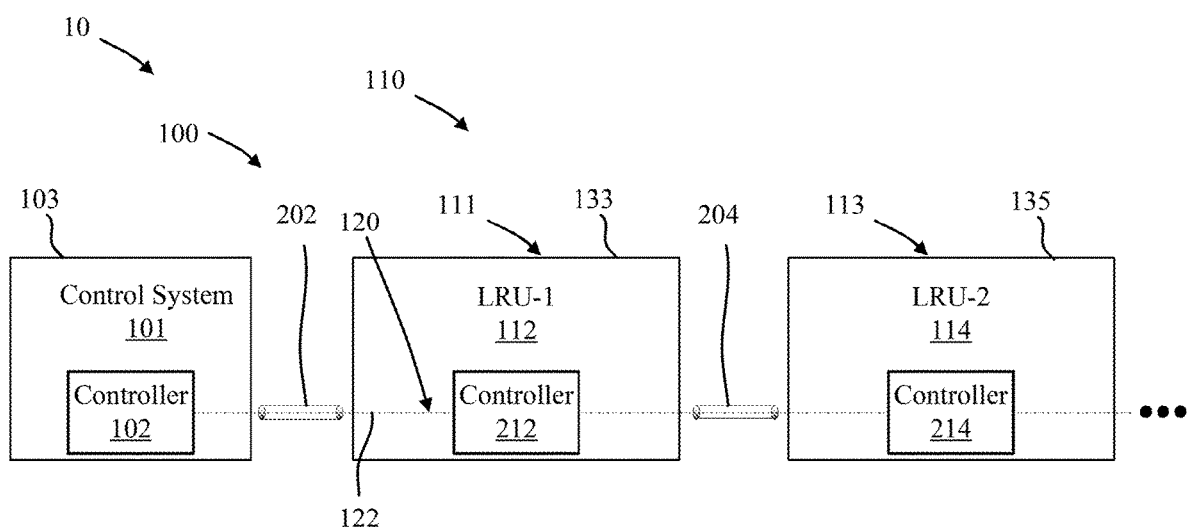
FIG. 2 illustrates a schematic view of an electrical system, in accordance with various embodiments.

Referring now to FIG. 2, each electronic device (e.g., electronic devices 111, 113) in the string of electronic devices 110 may comprise a local controller (e.g., controller 212 for LRU 112, controller 214 for LRU 114, etc.). In this regard, the local controller may control various systems and components of the respective electronic device. Thus, each local controller may be in accordance with the controller 102 as described above, with the exception of each local controller (e.g., controllers 212, 214, etc.) being controlled by the controller 102 of the control system 101 as described further herein.

In various embodiments, the communication line 120 comprises a plurality of wire segments, each wire segment extending from a first electronic device to a second electronic device. For example, a first communication line segment 122 extends from the controller 102 of the control system 101 to the controller 212 of the first electronic device 111 (e.g., first LRU 112) in the string of electronic devices 110. In various embodiments, each electronic device comprises a housing (e.g., housing 103 for control system 101, housing 133 for electronic device 111, housing 135 for electronic device 113, etc.). In various embodiments, the housing (e.g., housing 103, 133, 135) may comprise a printed circuit board, or the like.

In various embodiments, each communication line segment in the communication line 120 extends external to the housings (e.g., between housing 103 of the control system 101 to the housing 133 of the first electronic device 111, between housing 133 of the first electronic device 111 to the housing 135 of the second electronic device 113, etc.). Between respective housings, each communication line segment in the communication line 120 may be protected by a shield (e.g., shield 202 between housing 103 and housing 133, shield 204 between housing 133 and housing 135, etc.). The shield (e.g., shields 202, 204, etc.) are configured to prevent, or reduce, EMI. In various embodiments, the shields (e.g., shields 202, 204), are configured to surround the communication line 120. Each shield (e.g., shields 202, 204) may be made from a conductive material, such as graphene, carbon nanotube, mu-metal, beryllium copper, polymer nanocomposites, copper, etc.

Figure 3:
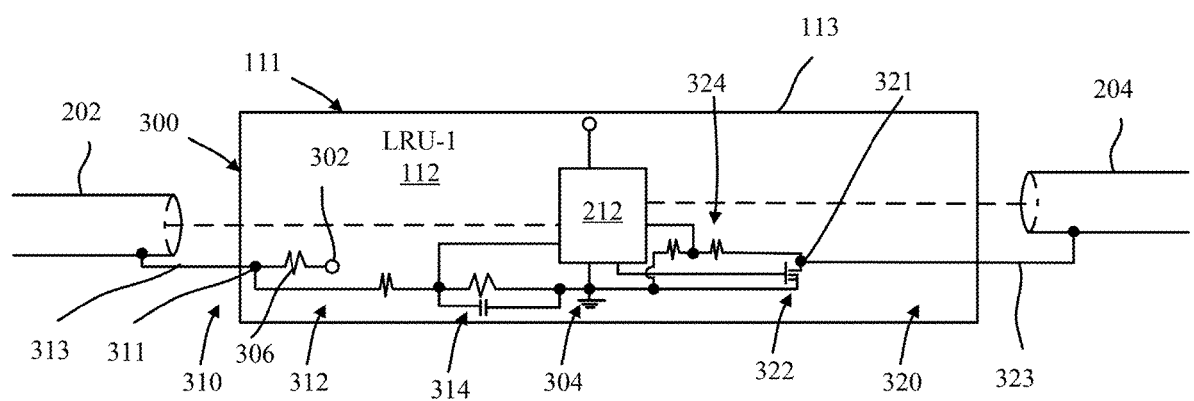
FIG. 3 illustrates a schematic view of a portion of an electrical system, in accordance with various embodiments.

Referring now to FIG. 3, a schematic view of a portion of an electrical circuit 300 for an electrical system 100 from FIG. 1 is illustrated, in accordance with various embodiments. In various embodiments, the electronic device 111 (e.g., LRU 112) in the string of electronic devices 110 from FIG. 1 comprises the portion of the electrical circuit 300 in the housing 133 (e.g., a printed circuit board) of the electronic device 111. In various embodiments, the portion of the electrical circuit 300 comprises a power source 302 (e.g., a battery), a pull-up resistor 306, an input circuit 310, an output circuit 320, and a ground 304.

The input circuit comprises 310 the pull-up resistor 306, the power source 302, and a divider resistor circuit 312. The pull up resistor 306 may be configured as a weak pull up resistor (e.g., with resistance of 10 kM, 100 kM, or the like). The pull up resistor 306 is disposed electrically between a first node 311 and the input circuit 310 and the power source 302. The first node 311 is defined at an intersection of a shield output line 313 extending from the shield 202, a pull up line having the pull up resistor 306, and a divider resistor circuit 312 (e.g., a voltage divider circuit or the like). The sensing circuit is in electrical communication with the controller 212 of the electronic device 111. In this regard, the controller 212 is configured to determine a location of the electronic device 111 within a string of electronic devices 110 from FIG. 1, as described further herein.

In various embodiments, the input circuit 310 comprises a filter capacitor 314. The filter capacitor 314 is configured to filter out various frequencies (e.g., frequencies close to 0 Hz) during operation of the electrical system 100, in accordance with various embodiments.

The output circuit 320 comprises an electrical switch 322 (e.g., a relay, a transistor, or the like) and an output sensing circuit 324 (e.g., a voltage divider circuit). In various embodiments, the electrical switch 322 is a transistor, such as a metal-oxide-semiconductor field-effect transistor (MOSFET) transistor. However, the present disclosure is not limited in this regard. The output circuit 320 may further comprise a shield input line 323 extending from a second node 321 of the output circuit 320 to a following shield (e.g., shield 204). In various embodiments, the second node is in electrical communication with a drain of the electrical switch 322 (e.g., in response to the electrical switch 322 being a MOSFET transistor).

In various embodiments, each electronic device in the plurality of electronic devices 110 from FIG. 1 is in accordance with the electronic device 111 from FIG. 3. In various embodiments, the control system 101 may comprise only an output circuit 320. Similarly, in accordance with various embodiments, the termination LRU 118 from FIG. 1 may only comprise the input circuit 310. However, the present disclosure is not limited in this regard. For example, the termination LRU 118 may comprise the output circuit 320, but the output circuit 320 may not be electrically coupled to an adjacent shield as the termination LRU 118 is Nth LRU in a string of N LRUs, in accordance with various embodiments.

Figure 4:
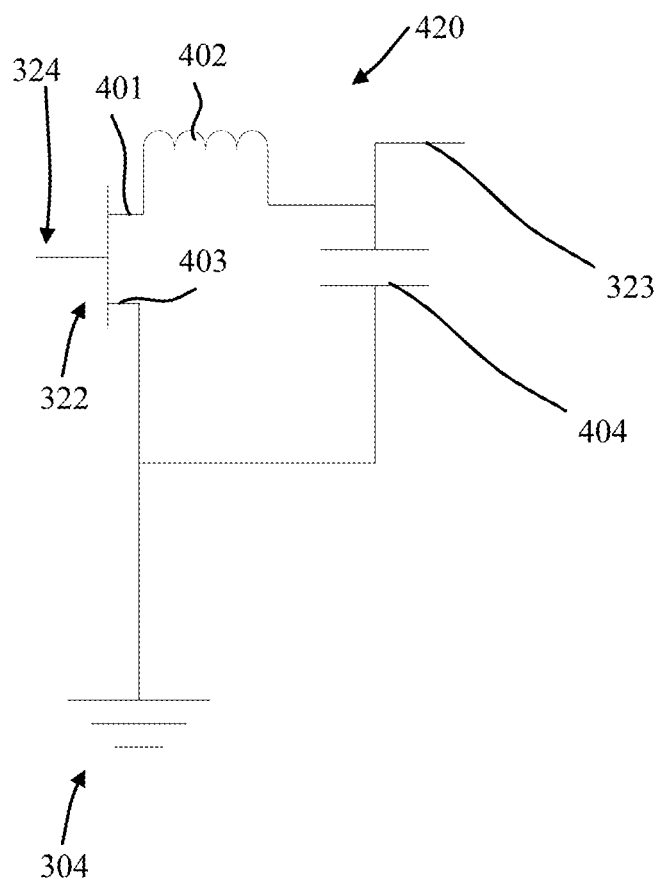
FIG. 4 illustrates an electrical circuit in an electrical system, in accordance with various embodiments.

Referring now to FIG. 4, a schematic view of an output circuit 420 is illustrated, in accordance with various embodiments. The output circuit 420 is in accordance with the output circuit 320 and further comprising an inductor 402 and a capacitor 404 creating an electrical circuit between a drain 401 of the electrical switch 322 and a source 403 of the electrical switch. In various embodiments, the output circuit 420 may facilitate performing of a tokening method as described further herein while maintaining an EMI reduction function of the shields 202, 204, whereas the output circuit 320 may temporarily remove the EMI reduction function of the shields 202, 204 during a tokening method described further herein.

Figure 5:
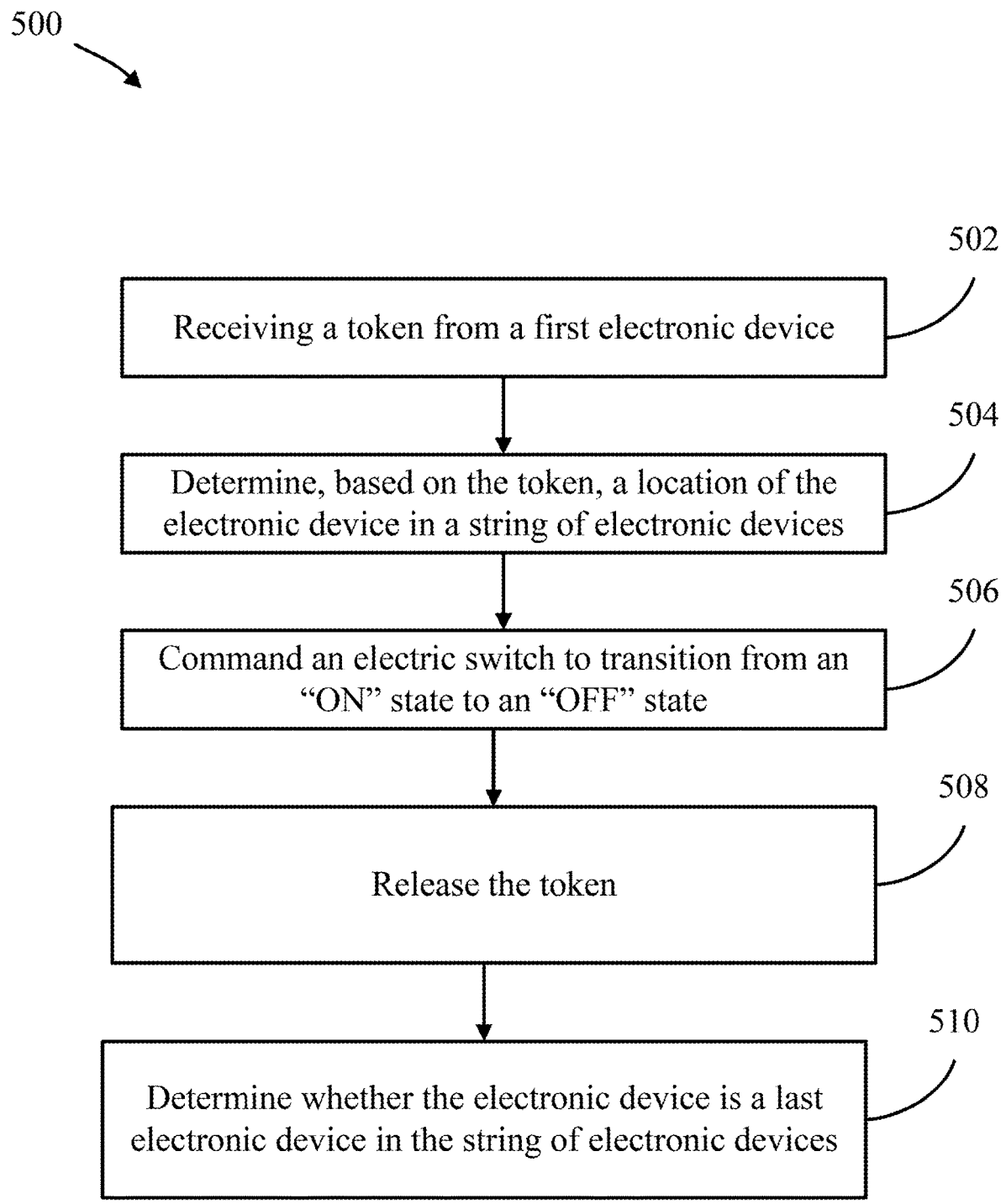
FIG. 5 illustrates a process of address identification in an electrical system, in accordance with various embodiments.

Referring now to FIG. 5, a process 500 for determining a location of an electronic device within a string of electronic devices is illustrated, in accordance with various embodiments. In various embodiments, the power source 302 of each electronic device is approximately 5 volts for illustrative purposes.

The process 500 comprises receiving, via a controller (e.g., controller 212, 214, etc.) a token from an external electronic device (e.g., control system 101, first electronic device 111, second electronic device 113, etc.) (step 502).

In various embodiments, the process 500 further comprises determining, based on the token, a location of the electronic device in a string of electronic devices (step 504). In various embodiments, if the location of the electronic device is a first electronic device in a string of electronic devices, the controller (e.g., controller 212) will detect that the forward shield (e.g., shield 202) is pulled down (e.g., from 5 volts to 0 volts) due to the pull up resistor 306 of the input circuit 310. A "forward shield" as described herein refers to a shield disposed immediately electrically forward from an electronic device in a string of electronic devices 110 from FIG. 1. Similarly, "an aft shield" as described herein refers to a shield disposed immediately electrically aft from an electronic device in a string of electronic devices 110. In various embodiments, if the location of the electronic device is not the first electronic device the token will include information as to a location of the prior electronic device as described further herein.

In various embodiments, the process 500 further comprises commanding an electrical switch 322 (e.g., a MOSFET transistor) to transition from an "ON" state to an "OFF" state. In response to the electrical switch 322 being transitioned to an "OFF" state, the aft shield (e.g., shield 204 when the electronic device is the first electronic device 111) is pulled up to 5 volts due to the pull up resistor 306 of the next electronic device (e.g., electronic device 113 in response to the electronic device being the first electronic device 111).

In various embodiments, the process 500 further comprises releasing the token (step 508). In this regard, referring back to step 504, in response to a controller receiving the token and detecting a forward shield being pulled down from 5 volts to 0 volts, the controller is able to determine that the electronic device is the next electronic device in the string of electronic devices 110 from FIG. 1. For example, in response to the controller 214 receiving a released token from controller 212 and detecting a forward shield (e.g., shield 204) being pulled down from 5 volts to 0 volts, the controller 214 determines that the electronic device is the second electronic device 113 in the string of electronic devices 110.

In various embodiments, the process 500 may be repeated for each electronic device in the string of electronic devices 110 from FIG. 1 until a location of each electronic device in the string of electronic devices 110 from FIG. 1 is determined and sent to the controller 102 of the control system 101.

In various embodiments, the process 500 further comprises determining whether the electronic device is a last electronic device (e.g., a termination LRU 118) in a string of electronic devices 110 from FIG. 1 (step 510). Referring back to step 506, if the electric switch of the electronic device is transition from an "ON" state to an "OFF" state and the controller does not detect an aft shield being pulled up to 5 volts, the controller determines that the electronic device is the termination LRU 118.

Figure 6:
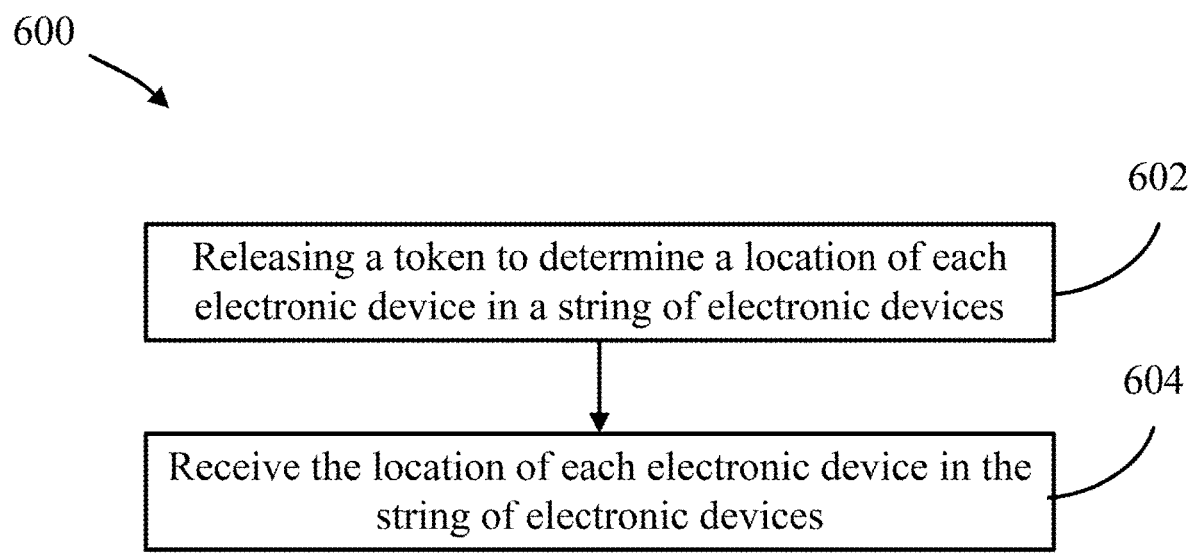
FIG. 6 illustrates a process of address identification in an electrical system, in accordance with various embodiments.

Referring now to FIG. 6, a process 600 for determining a location of each electronic device in a string of electronic devices 110 from FIG. 1 is illustrated, in accordance with various embodiments. The process 600 comprises releasing, via a controller 102 from FIG. 1, a token to determine a location of each electronic device in a string of electronic devices (step 602). The process 600 further comprises receiving, via the controller 102 from FIG. 1, a location of each electronic device in the string of electronic devices (step 604). In this regard, each electronic device in the string of electronic devices 110 transmits (e.g., via the communication line 120) a location identifier of the respective electronic device (e.g., first electronic device 111 transmits to the controller 102 a first location identifier indicating a first location in the string of electronic devices, the second electronic device 113 transmits to the controller 102 a second location identifier indicating a second location in the string of electronic identifiers, and so on.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

Finally, it should be understood that any of the above described concepts can be used alone or in combination with any or all of the other above described concepts. Although various embodiments have been disclosed and described, one of ordinary skill in this art would recognize that certain modifications would come within the scope of this disclosure. Accordingly, the description is not intended to be exhaustive or to limit the principles described or illustrated herein to any precise form. Many modifications and variations are possible in light of the above teaching.

What is claimed is:

1. An electronic device, comprising:
    a forward shield;
    a token input circuit comprising a token input electrical line, a pull up resistor, and a power source;
    a token output circuit comprising a token output electrical line and an electrical switch;
    a communication input electrical line;
    a communication output electrical line;
    a processor in electrical communication with the token input electrical line, the token output electrical line, the communication input electrical line, and the communication output electrical line; and
    a tangible, non-transitory computer-readable storage medium having instructions stored thereon that, in response to execution by the processor, cause the processor to perform operations comprising:
        receiving, via the processor, a token from an adjacent electronic device via the token input electrical line, and
        determining, based on the token, a location of the electronic device in a string of electronic devices, wherein the location is determined based on the forward shield pulling down from a first voltage to 0 volts due to the pull up resistor.

2. The electronic device of claim 1, wherein the operations further comprise commanding the electrical switch to transition from an "ON" state to an "OFF" state in response to determining the location of the electronic device.

3. The electronic device of claim 2, wherein the operations further comprise releasing the token in response to transitioning the electrical switch from the "ON" state to the "OFF" state.

4. The electronic device of claim 1, wherein the operations further comprise determining the electronic device is a first electronic device in the string of electronic devices based on the forward shield of the electronic device being pulled down from a first voltage to 0 volts from the pull up resistor.

5. The electronic device of claim 1, wherein the token input circuit further comprises a first voltage divider, and wherein the token output circuit further comprises a second voltage divider.

6. The electronic device of claim 1, wherein the token input electrical line is configured to be coupled to a first shield configured to surround a communication wire configured to couple to the communication input electrical line.

7. The electronic device of claim 6, wherein the token output electrical line is configured to be coupled to a second shield configured to surround a second communication wire configured to couple to the communication output electrical line.

8. An electrical system, comprising:
    a control system comprising a controller; and
    a string of electronic devices connected in series between the control system and an end electronic device, each of the string of electronic devices electrically coupled to an adjacent electronic device in the string of electronic devices by a communication line segment enclosed by a shield, each of the string of electronic devices comprising a local controller in electrical communication with a forward communication line segment and a forward shield, the forward shield surrounding the forward communication line segment, wherein the local controller for each of the string of electronic devices is configured to:
        receive a token from the controller, and
        determine, based on the token, that the first electronic device is in a first location in the string of electronic devices, wherein the first location is determined based on the shield pulling down from a first voltage to 0 volts due to the pull up resistor.

9. The electrical system of claim 8, wherein the forward shield is configured to reduce electromagnetic interference ("EMI").

10. The electrical system of claim 8, wherein the controller is configured to:
 release a token to determine a location of each electronic device in the string of electronic devices; and
 receive, from the local controller of each of the string of electronic devices and the end electronic device, the location of the respective electronic device.

11. The electrical system of claim 8, wherein the electrical system is an aircraft lighting system.

12. The electrical system of claim 11, wherein each electronic device is a line replaceable unit (LRU) having a plurality of light emitting diodes (LEDs).

13. The electrical system of claim 8, wherein the electrical system is configured to determine a location of each electronic device in the string of electronic devices by creating a circuit between adjacent electronic devices through the forward shield.

14. An electrical system, comprising:
 a control system including a controller;
 a first electronic device in a string of electronic devices, the first electronic device comprising a local controller electrically coupled to the controller, a token input line in electrical communication with the local controller, a pull up resistor, and a power source;
 a communication line segment extending from the control system to the first electronic device, the communication line segment in electrical communication with the controller and the local controller; and
 a shield surrounding the communication line segment, the shield configured to reduce electromagnetic interference ("EMI"), the shield in electrical communication with the token input line, the pull up resistor, and the power source, wherein:
 the first electronic device further comprises an electrical switch in electrical communication with a token output line, and
 the local controller is configured to:
  receive a token from the controller; and
  determine, based on the token, that the first electronic device is in a first location in the string of electronic devices, wherein the first location is determined based on the shield pulling down from a first voltage to 0 volts due to the pull up resistor.

15. The electrical system of claim 14, further comprising the string of electronic devices, each electronic device in the string of electronic devices in accordance with the first electronic device.

16. The electrical system of claim 14, wherein the local controller is further configured to command the electrical switch to transition from an "ON" state to an "OFF" state in response to determining the first electronic device is in the first location in the string of electronic devices.

17. The electrical system of claim 16, wherein the local controller is further configured to release the token in response to transitioning the electrical switch from the "ON" state to the "OFF" state.

* * * * *